(12) United States Patent
Kent et al.

(10) Patent No.: US 8,559,402 B2
(45) Date of Patent: *Oct. 15, 2013

(54) METHOD AND SYSTEM FOR CHANNEL ESTIMATION IN A SPATIAL MULTIPLEXING MIMO SYSTEM

(75) Inventors: Mark Kent, Vista, CA (US); Vinko Erceg, Cardiff, CA (US); Uri M Landau, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,221

(22) Filed: Aug. 9, 2011

(65) Prior Publication Data

US 2011/0293044 A1 Dec. 1, 2011

Related U.S. Application Data

(63) Continuation of application No. 12/427,206, filed on Apr. 21, 2009, now Pat. No. 7,995,537, which is a continuation of application No. 11/172,756, filed on Jun. 30, 2005, now Pat. No. 7,522,562.

(60) Provisional application No. 60/616,778, filed on Oct. 6, 2004.

(51) Int. Cl.
*H04Q 7/00* (2006.01)

(52) U.S. Cl.
USPC .......................................... 370/334; 375/320

(58) Field of Classification Search
USPC ................ 370/334; 375/260; 342/372, 157
See application file for complete search history.

(56) References Cited

U.S. PATENT DOCUMENTS

| | | | |
|---|---|---|---|
| 5,585,803 A | 12/1996 | Miura et al. | |
| 6,128,276 A | 10/2000 | Agee | |
| 7,522,562 B2 | 4/2009 | Kent et al. | |
| 7,995,537 B2 | 8/2011 | Kent et al. | |
| 2003/0031234 A1 | 2/2003 | Smee et al. | |
| 2004/0136313 A1 | 7/2004 | Goldstein et al. | |
| 2005/0243898 A1 | 11/2005 | Reznik et al. | |
| 2006/0045193 A1* | 3/2006 | Stolpman et al. | 375/260 |

(Continued)

OTHER PUBLICATIONS

Haykin, S., et al., "Turbo-MIMO for Wireless Communications," IEEE Communications Magazine: Adaptive Antennas and MIMO Systems for Wireless Communications, vol. 42, Issue 10, Oct. 2004; pp. 48-53.

(Continued)

*Primary Examiner* — Phuoc Doan
(74) *Attorney, Agent, or Firm* — Sterne, Kessler, Goldstein & Fox P.L.L.C.

(57) ABSTRACT

Aspects of a method and system for channel estimation in a SM MIMO communication system may comprise receiving a plurality of spatially multiplexed communication signals from a plurality of transmit antennas. A plurality of baseband combined channel estimates based on phase rotation may be generated in response to the received plurality of spatially multiplexed communication signals. An estimate of the channel matrix may be determined based on the baseband combined channel estimates. A plurality of amplitude and phase correction signals may be generated in response to receiving the estimate of the channel matrix. An amplitude and a phase of at least a portion of the received plurality of spatially multiplexed communication signals may be adjusted based on the generated plurality of amplitude and phase correction signals, respectively.

20 Claims, 8 Drawing Sheets

(56) References Cited

U.S. PATENT DOCUMENTS

2006/0072511 A1  4/2006  Kent et al.
2007/0015545 A1  1/2007  Leifer et al.
2009/0257521 A1  10/2009  Kent et al.

OTHER PUBLICATIONS

Love, D. J., et al., "What is the Value of Limited Feedback for MIMO Channels?" IEEE Communications Magazine: Adaptive Antennas and MIMO Systems for Wireless Communications, vol. 42, Issue 10, Oct. 2004; pp. 54-59.

Mietzner, J., et al., "Boosting the Performance of Wireless Communication Systems: Theory and Practice of Multiple-Antenna Techniques," IEEE Communications Magazine: Adaptive Antennas and MIMO Systems for Wireless Communications, vol. 42, Issue 10, Oct. 2004; pp. 40-47.

Nosratinia, A., et al., "Cooperative Communication in Wireless Networks," Communications Magazine: Adaptive Antennas and MIMO Systems for Communications, vol. 42, Issue 10, Oct. 2004; pp. 74-80.

Sanayei, S., et al., "Antenna Selection in MIMO Systems," IEEE Communications Magazine: Adaptive Antennas and MIMO Systems for Wireless Communications, vol. 42, Issue 10, Oct. 2004; pp. 68-73.

Spencer, Q. H., et al., "An Introduction to the Multi-User MIMO Downlink," IEEE Communications Magazine: Adaptive Antennas and MIMO Systems for Wireless Communications, vol. 42, Issue 10, Oct. 2004; pp. 60-67.

Winters, J. H., "Optimum Combining for Indoor Radio Systems with Multiple Users," IEEE Transactions on Communications, vol. COM-35, Issue 11, Nov. 1987; pp. 1222-1230.

Non-Final Rejection mailed Sep. 25, 2007 for U.S. Appl. No. 11/172,756, filed Jun. 30, 2005; 8 pages.

Non-Final Rejection mailed May 5, 2008 for U.S. Appl. No. 11/172,756, filed Jun. 30, 2005; 8 pages.

Notice of Allowance mailed Nov. 28, 2008 for U.S. Appl. No. 11/172,756, filed Jun. 30, 2005; 6 pages.

Non-Final Rejection mailed May 24, 2010 for U.S. Appl. No. 12/427,206, filed Apr. 21, 2009; 11 pages.

Non-Final Rejection mailed Oct. 22, 2010 for U.S. Appl. No. 12/427,206, filed Apr. 21, 2009; 10 pages.

Notice of Allowance mailed Mar. 31, 2011 for U.S. Appl. No. 12/427,206, filed Apr. 21, 2009; 7 pages.

* cited by examiner

METHOD AND SYSTEM FOR CHANNEL ESTIMATION IN A SPATIAL MULTIPLEXING MIMO SYSTEM

CROSS-REFERENCE TO RELATED APPLICATIONS/INCORPORATION BY REFERENCE

This patent application is a continuation of U.S. patent application Ser. No. 12/427,206 filed Apr. 21, 2009, which application is a continuation of U.S. patent application Ser. No. 11/172,756 filed on Jun. 30, 2005, now U.S. Pat. No. 7,522,562 issued on Apr. 21, 2009, which makes reference to, claims priority to and claims benefit from U.S. provisional patent application Ser. No. 60/616,778 filed on Oct. 6, 2004.

This application makes reference to:
U.S. patent application Ser. No. 11/173,870 filed Jun. 30, 2005;
U.S. patent application Ser. No. 11/174,303 filed Jun. 30, 2005, issued as U.S. Pat. No. 7,643,839 on Jan. 5, 2010;
U.S. patent application Ser. No. 11/173,502 filed Jun. 30, 2005;
U.S. patent application Ser. No. 11/173,871 filed Jun. 30, 2005, issued as U.S. Pat. No. 7,894,507 on Feb. 22, 2011;
U.S. patent application Ser. No. 11/173,964 filed Jun. 30, 2005, issued as U.S. Pat. No. 7,787,520 on Aug. 31, 2010;
U.S. patent application Ser. No. 11/173,252 filed Jun. 30, 2005, issued as U.S. Pat. No. 7,471,694 on Dec. 30, 2008;
U.S. patent application Ser. No. 11/174,252 filed Jun. 30, 2005;
U.S. patent application Ser. No. 11/173,305 filed Jun. 30, 2005;
U.S. patent application Ser. No. 11/172,759 filed Jun. 30, 2005, issued as U.S. Pat. No. 7,483,675 on Jan. 27, 2009;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005, issued as U.S. Pat. No. 7,991,361 on Aug. 2, 2011;
U.S. patent application Ser. No. 11/172,779 filed Jun. 30, 2005, issued as U.S. Pat. No. 7,586,886 on Sep. 8, 2009;
U.S. patent application Ser. No. 11/172,702 filed Jun. 30, 2005, issued as U.S. Pat. No. 7,593,493 on Sep. 22, 2009;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005, issued as U.S. Pat. No. 7,505,539 on Mar. 17, 2009.

Each of the above referenced applications is hereby incorporated herein by reference in its entirety.

FIELD OF THE INVENTION

Certain embodiments of the invention relate to channel estimation. More specifically, certain embodiments of the invention relate to a method and system for channel estimation in a spatial multiplexing multi-input multi-output (MIMO) system.

BACKGROUND OF THE INVENTION

In most current wireless communication systems, nodes in a network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11 a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

In the case of a single RF chain with multiple antennas, there is a need to determine or estimate separate propagation channels. A simple method may comprise switching to a first receive antenna utilizing, for example, an RF switch, and estimate a first propagation channel. After estimating the first propagation channel, another receive antenna may be selected and its corresponding propagation channel may be estimated. In this regard, this process may be repeated until all the channels have been estimated. However, switching between receive antennas may disrupt the receiver's modem and may lower throughput. Moreover, this approach may require additional hardware and may also result in propagation channel estimates at different time intervals.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A method and/or system for channel estimation in a spatial multiplexing multiple-input multiple-output (MIMO) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method for channel estimation in a communication system. Aspects of the method may comprise receiving a plurality of spatially multiplexed communication signals from a plurality of transmit antennas. A plurality of baseband combined channel estimates based on phase rotation may be generated in response to receiving the plurality of spatially multiplexed communication signals. A plurality of amplitude and phase correction signals may be generated based on the generated plurality of baseband combined channel estimates. An amplitude and a phase of at least a portion of the received plurality of spatially multiplexed communication signals may be adjusted based on the generated plurality of amplitude and phase correction signals, respectively.

Spatial multiplexing (SM) may provide a mode of signal transmission predicated upon the use of multiple antennas at both a transmitter and a receiver, for example, in such a way that the capacity of a wireless radio link may be increased without correspondingly increasing power or bandwidth consumption. In a case in which N antennas are used at both a transmitter and a receiver, an input stream of information symbols provided to the transmitter is divided into N independent substreams. Spatial multiplexing contemplates that each of these N independent substreams may occupy the same "space-time channel", for example, time slot, frequency, or code/key sequence, of the applicable multiple-access protocol. Within the transmitter, each substream may be separately applied to the N transmit antennas and propagated over an intervening multipath communication channel to a receiver. Error correction coding may be applied to each of the N streams separately or in a combined space-time methodology.

The composite multipath signals may then be received by an array of N or more receive antennas deployed at the receiver. At the receiver, a "spatial signature" defined by the N phases and N amplitudes arising at the receive antenna array for a given substream may be then estimated. Signal processing techniques may be then applied in order to spatially separate the received signals, which may allow the original substreams to be recovered and synthesized into the original input symbol stream. An overall system capacity of the order of the minimum of M and N, min(M,N), for example, may be achieved, where M may be the number of receive antennas and N may be the number of transmit antennas for flat fading channel conditions. The principles of spatially multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Figure 1:
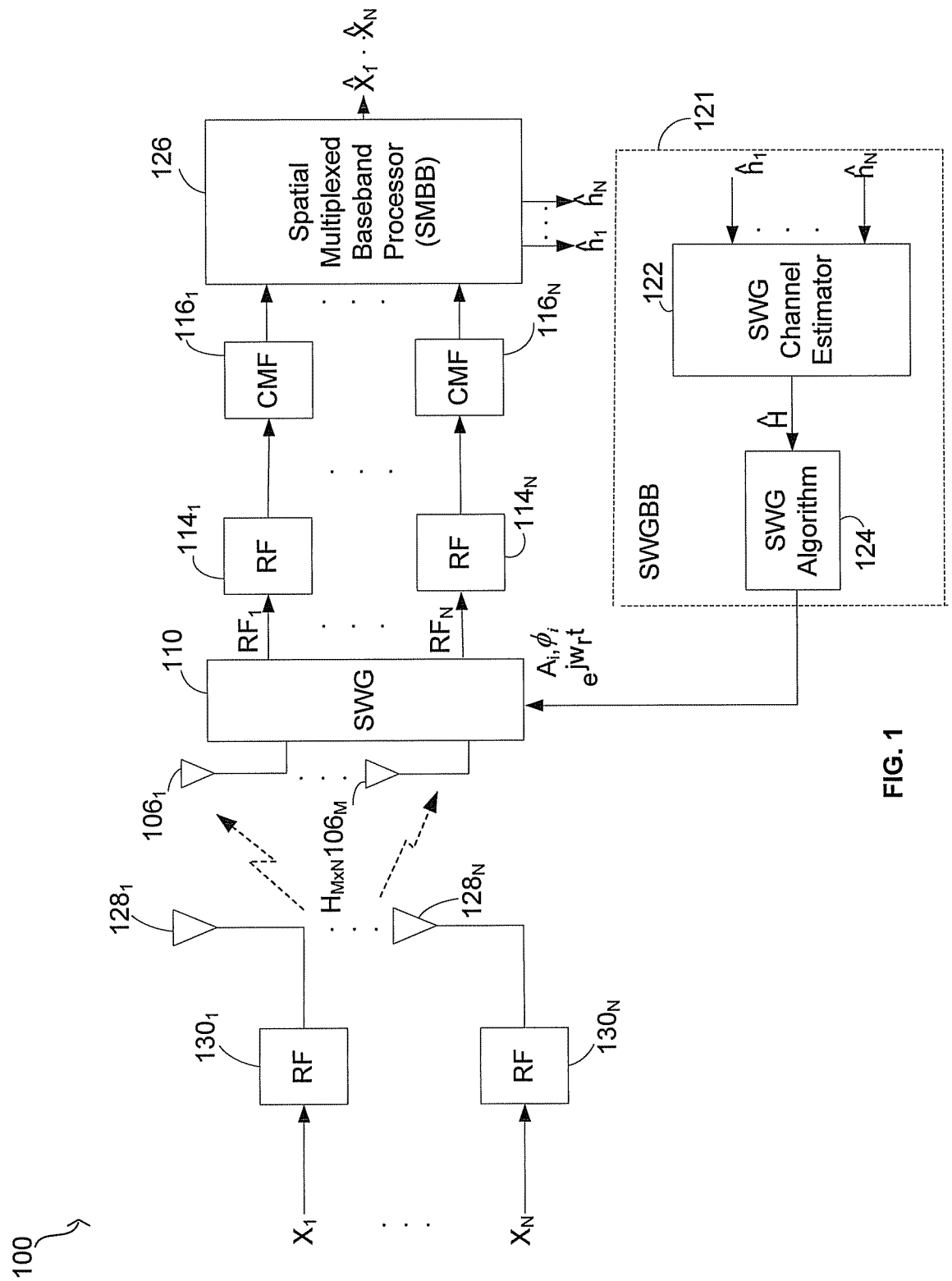
FIG. 1 is a block diagram of an exemplary spatially multiplexed wireless communication system with receiver channel estimation, in accordance with an embodiment of the invention.

FIG. 1 is a block diagram of an exemplary spatially multiplexed wireless communication system with receiver channel estimation, in accordance with an embodiment of the invention. Referring to FIG. 1, the wireless system 100 may comprise a plurality of RF transmit blocks $130_{1...N}$, a plurality of transmit antennas $128_{1...N}$, a plurality of receive antennas $106_{1...M}$, a single weight generator (SWG) 110, a plurality of RF blocks $114_{1...N}$, a plurality of chip matched filters (CMF) $116_{1...N}$, a spatial multiplexing baseband (SMBB) processor 126 and a single weight generator baseband processor block (SWGBB) 121. The SWGBB 121 may comprise a SWG channel estimator 122 and a single weight generator (SWG) algorithm block 124. In the system of FIG. 1 the number of receiving antennas is greater than the number of receive RF chains, M>N, while the number of receive and transmit RF chains is equal (N).

The RF transmit blocks $130_{1...N}$ may comprise suitable logic, circuitry, and/or code that may be adapted to process an RF signal. The RF transmit blocks $130_{1...N}$ may perform, for example, filtering, amplification, and mixing operations. The plurality of transmit antennas $128_{1...N}$ may transmit the processed RF signals from the plurality of RF transmit blocks $130_{1...N}$ to a plurality of receive antennas $106_{1...M}$, where the number of transmit antennas N may be equal to the number of RF paths N. The plurality of receive antennas $106_{1...M}$ may each receive a portion of the transmitted signal. The plurality of transmit antennas $128_{1...N}$ may transmit the processed RF signals via a matrix $H_{M\times N}$ of channels that may be utilized by the single weight generator block SWG 110, where M may represent the number of receive antennas and N may represent the number of transmit antennas. The single weight generator SWG 110 may comprise suitable logic, circuitry, and/or code that may be adapted to determine a plurality of weights to be applied to each of the input signals to modify the phase and amplitude of a portion of the transmitted signals received by the plurality of receive antennas $106_{1...M}$ and generate a plurality of output signals $RF_{1...N}$.

The plurality of RF blocks $114_{1...N}$ may comprise suitable logic, circuitry, and/or code that may be adapted to process an RF signal. The plurality of RF blocks $114_{1...N}$ may perform, for example, filtering, amplification, and analog-to-digital (A/D) conversion operations. The plurality of chip matched filters (CMFs) $116_{1...N}$ may comprise suitable logic, circuitry and/or code that may be adapted to filter the output of the plurality of RF receive blocks $114_{1...N}$ to generate in-phase and quadrature components (I, Q). The outputs of the plurality of chip matched filters $116_{1...N}$ may be transferred to the SMBB processor 126.

The SMBB processor 126 may be adapted to receive a plurality of in-phase and quadrature components (I, Q) from a plurality of chip matched filters (CMF) $116_{1...N}$ to generate a plurality of baseband combined channel estimates $\hat{h}_1$ to $\hat{h}_N$ and estimates $\hat{X}_1 \ldots \hat{X}_N$ of the original input spatial multiplexing sub-stream signals or symbols $X_1 \ldots X_N$.

The SWG channel estimator 122 may comprise suitable logic, circuitry, and/or code that may be adapted to process the received baseband combined channel estimates $\hat{h}_1$ to $\hat{h}_N$ from the SMBB processor 126 and may generate a matrix $\hat{H}$ of channel estimates that may be utilized by the single weight generator (SWG) algorithm block 124.

The SWG algorithm block 124 may determine a plurality of phase and amplitude values $A_i$ and $\phi_i$ which may be utilized by SWG 110 to modify the phase and/or amplitude of a portion of the transmitted signals received by the plurality of receive antennas $106_{1...M}$ and generate a plurality of output signals $RF_{1...N}$.

The signals $X_1 \ldots X_N$ may be filtered, amplified and transmitted to a plurality of M receive antennas $106_{1...M}$ via a plurality of N transmit antennas $128_{1...N}$. The single weight generator SWG 110 may comprise suitable logic, circuitry, and/or code that may be adapted to determine a plurality of weights to be applied to each of the received spatially demultiplexed communication signals to modify the phase and/or amplitude of a portion of the transmitted signals received by the plurality of receive antennas $106_{1...M}$ and generate a plurality of output signals $RF_{1...N}$. The plurality of RF blocks $114_{1...N}$ may receive the generated plurality of RF signals $RF_{1...N}$ and may perform, for example, filtering, amplification, and mixing operations. The plurality of chip matched filters (CMF) $116_{1...N}$ may be adapted to modulate the RF signals $RF_{1...N}$ to generate in-phase and quadrature components (I, Q). The SMBB processor 126 may be adapted to receive the generated plurality of in-phase and quadrature components (I, Q) from the plurality of chip matched filters (CMF) $116_{1...N}$ to generate a plurality of baseband combined channel estimates $\hat{h}_1$ to $\hat{h}_P$ and an estimates $\hat{X}_1 \ldots \hat{X}_N$ of the original input signals $X_1 \ldots X_N$.

Figure 2:
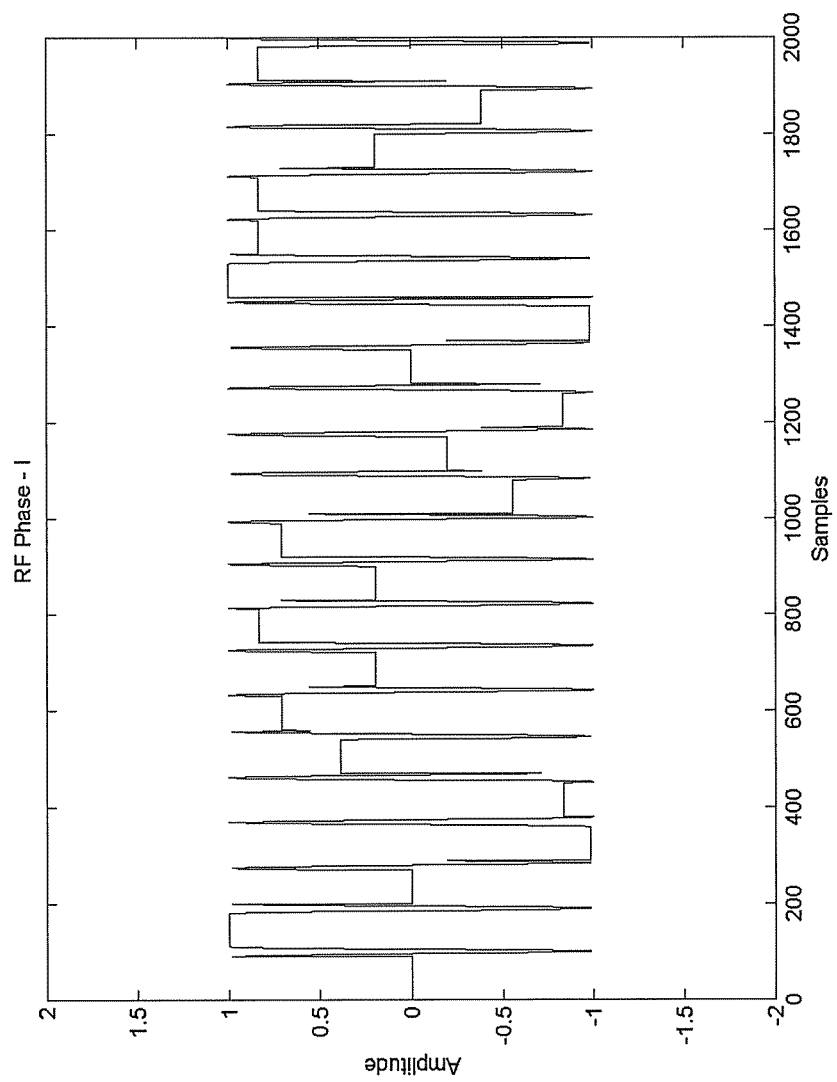
FIG. 2 illustrates an exemplary periodic phase rotation for an I signal component, in accordance with an embodiment of the invention.

FIG. 2 illustrates an exemplary periodic phase rotation for an I signal component, in accordance with an embodiment of the invention. Referring to FIG. 2, for the wireless system 100 in FIG. 1, by rotating the phase at the receive antennas $106_{1...M}$, it may be possible to estimate propagation channels $\hat{H}_{N\times M}$. This operation is equivalent to orthogonalizing all the channels at the Rx antennas. FIG. 2 illustrates the periodic rotation of the I component in an RF signal. If the number of receive antennas is the same as the number of receive RF chains, the propagation channel matrix $\hat{H}_{N\times M}$ may be estimated directly without the phase rotation. The phase rotation yields the propagation channel matrix $\hat{H}_{N\times M}$ estimation when the number of receive antennas is greater than the number of receiving RF chains.

Figure 3A:
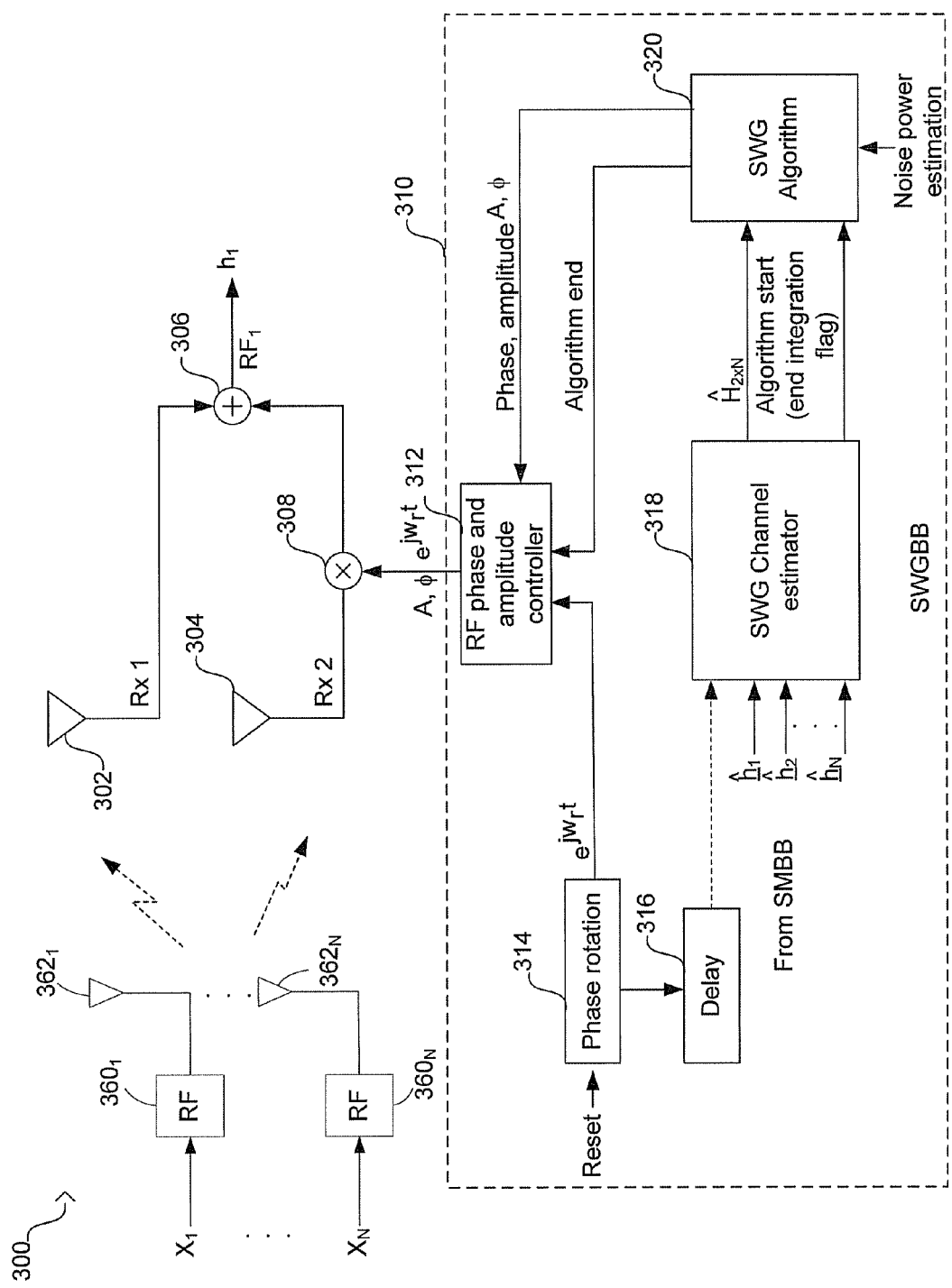
FIG. 3A is a block diagram of an exemplary system for providing phase rotation, channel estimation and for determining optimal phase and amplitude parameters or setting for an additional receive antenna, in accordance with an embodiment of the invention.

FIG. 3A is a block diagram of an exemplary system for providing phase rotation, channel estimation and for determining optimal phase and amplitude parameters or settings for an additional receive antenna, in accordance with an embodiment of the invention. Referring to FIG. 3A, a receiver system 300 may comprise a first receive antenna Rx 1 302, an additional antenna Rx 2 304, a combiner 306, a complex multiplier 308, and a single weight generator baseband (SWGBB) processor 310. The SWGBB processor 310 may comprise a phase rotation start controller block 314, a delay block 316, a SWG channel estimator 318, a single weight generator (SWG) algorithm block 320, and a RF phase and amplitude controller 312. The SWGBB processor 310 provides similar functionality as the SMBB processor 126 in FIG. 1.

The receive antennas Rx 1 302 and Rx 2 304 may each receive a portion of the transmitted signal. The combiner 306 may be adapted to combine the received signals into a single RF signal $RF_1$, for example. The complex multiplier 308 may be adapted to receive a plurality of input signals from the additional receive antenna Rx 2 304 and the RF phase and amplitude controller 312 and may generate an output signal to the combiner 306.

The phase rotation start controller block 314 may comprise suitable logic, circuitry and/or that may be adapted to start after receiving a reset signal and may generate a plurality of output signals to the delay block 316 and the RF phase and amplitude controller 312. The delay block 316 may be adapted to receive an input signal from the phase rotation start controller block 314 and generate a delayed output signal to the SWG channel estimator 318. The SWG channel estimator 318 may comprise suitable logic, circuitry, and/or code that may be adapted to process the received baseband combined channel estimates per transmit antenna $\hat{h}_1 \ldots \hat{h}_N$ from the SMBB processor 126 and may generate a matrix $\hat{H}_{2\times N}$ of processed estimated channels. The SWG channel estimator 318 may be adapted to generate an algorithm start signal indicating the end of integration that may be utilized by the single weight generator (SWG) algorithm block 320.

The SWG algorithm block 320 may be adapted to receive a plurality of signals from the SWG channel estimator 318, for example, a matrix $\hat{H}_{2\times N}$ of processed baseband combined channel estimates, an algorithm start signal from the SWG channel estimator 318 and a noise power estimation signal. The SWG algorithm block 320 may generate phase and amplitude correction signals and an algorithm end signal to the RF phase and amplitude controller 312. The RF phase and amplitude controller 312 may be adapted to receive the phase and amplitude values and the algorithm end signal to modify the phase and amplitude of a portion of the transmitted signals received by the receive antenna Rx 2 302 and generate an output signal $RF_1$.

The SWG channel estimator 318 may receive baseband combined channel estimates $\hat{h}_1 \ldots \hat{h}_N$, which may include all transmission channels from N Tx antennas and each Tx antenna may have a different channel estimation sequence, so that the different combined channels $\hat{h}_1 \ldots \hat{h}_N$ may be separated and estimated. The SWG channel estimator 318 may generate a matrix of channel estimates $\hat{H}_{2 \times N}$ to the SWG algorithm block 320. A reset signal may be utilized to start the phase rotation block 314. The combined channel estimates from the SMBB 126 in FIG. 1 may be transferred to the channel estimator 318 for processing. When processing is complete, the SWG channel estimator 318 may indicate to the SWG algorithm block 320 that the determination of the appropriate phase and amplitude correction for the portion of the received signal in the additional antenna Rx 2 304 may start. The SWG algorithm block 320 may utilize an estimation of the noise power and interference in determining the phase and amplitude values in addition to the matrix of channel estimates $\hat{H}_{2 \times N}$. The SWG algorithm block 320 may indicate to the RF phase and amplitude controller 312 the end of the weight determination operation and may then transfer to the RF phase and amplitude controller 312, the determined phase and amplitude values. The RF phase and amplitude controller 312 may then modify the portion of the received signal in the additional antenna Rx 2 304 via the complex multiplier 308.

In operation, the RF phase and amplitude controller 312 may apply the signal $e^{jw_r t}$ to the mixer 308 in FIG. 3A based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signal $Ae^{j\phi}$ to the mixer 308 in FIG. 3A.

Figure 3B:
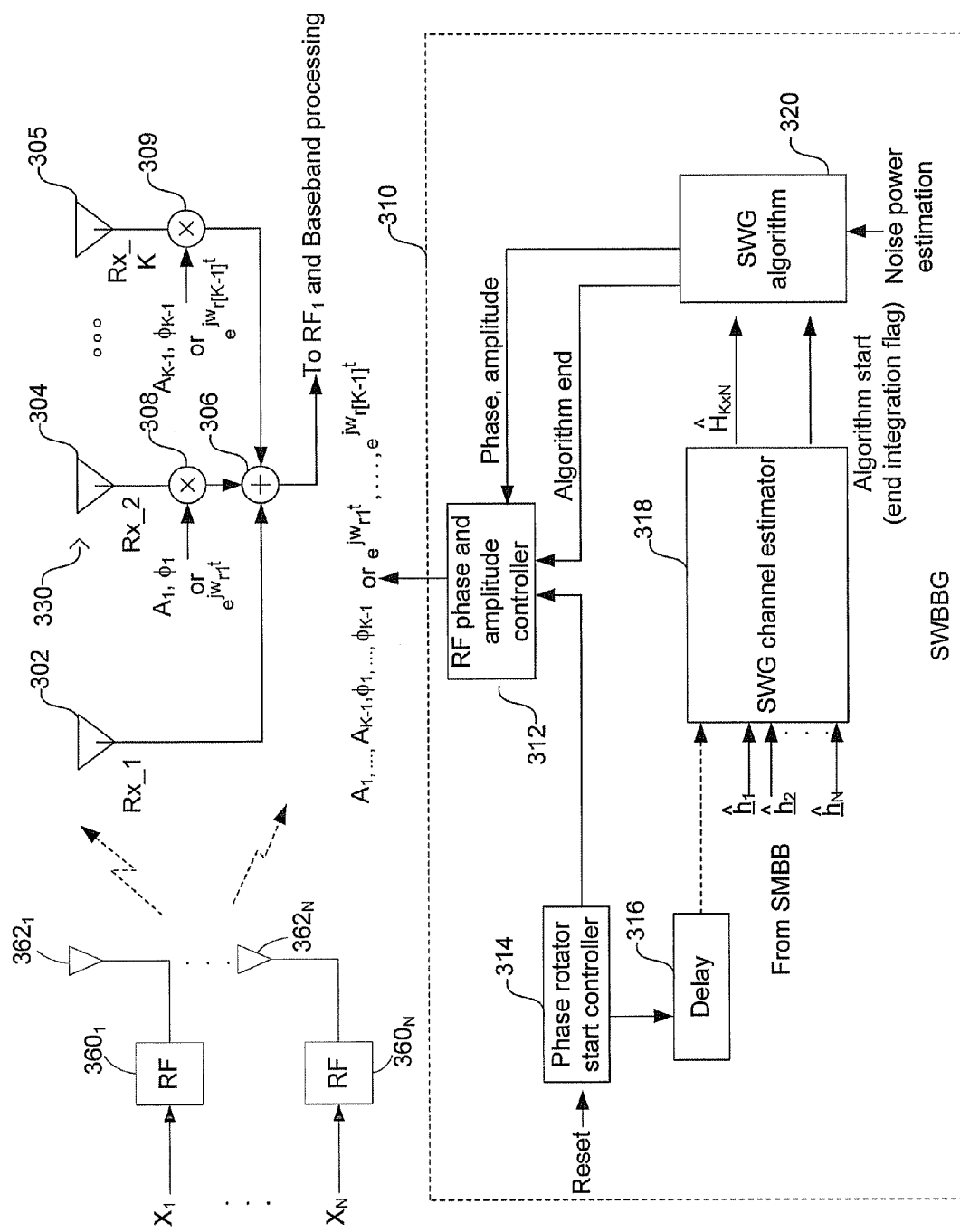
FIG. 3B is a block diagram of an exemplary system for providing phase rotation, channel estimation and for determining optimal phase and amplitude parameters or setting for additional K−1 receive antennas, in accordance with an embodiment of the invention.

FIG. 3B is a block diagram of an exemplary system for providing phase rotation, channel estimation and for determining optimal phase and amplitude parameters or setting for additional K−1 receive antennas, in accordance with an embodiment of the invention. Referring to FIG. 3B, a receiver system 330 may correspond to a portion of the wireless communication system 100 in FIG. 1 and may differ from the receiver system 300 in FIG. 3A in that (K−1) additional receive antennas, Rx_2 304 to Rx_K 305, and (K−1) mixers 308 to 309 may be utilized. The combiner 306 may combine the received signals into a single RF signal $RF_1$, for example. In this regard, the SWG channel estimator 318 may be adapted to process the combined channel estimates, $\hat{h}_1 \ldots \hat{h}_N$, and determine the propagation channel matrix estimate $\hat{H}_{K \times N}$.

Referring to the FIG. 1, multiple receive antennas may be connected to each of the RF chains $RF_1 \ldots RF_N$ as shown in FIG. 3B for the single RF chain $RF_1$. In this regard, the combined channel estimates $\hat{h}_1 \ldots \hat{h}_N$ and consequently the channel estimate matrix $\hat{H}_{K \times N}$ may be determined per each RF chain $RF_1 \ldots RF_N$. Consequently, following this example, N matrices $\hat{H}_{K \times N}$ may form a channel estimate matrix $\hat{H}_{M \times N}$ in FIG. 1 (M=NK).

The SWG algorithm block 320 may also be adapted to determine (K−1) channel weights per RF chain, that may be utilized to maximize receiver SINR, for example, to be applied to the mixers 308 to 309 to modify the portions of the transmitted single channel communication signals received by the additional receive antennas Rx_2 304 to Rx_K 305. The (K−1) channel weights per RF chain may comprise amplitude and phase components, $A_1$ to $A_{K-1}$ and $\phi_1$ to $\phi_{K-1}$. The RF phase and amplitude controller 312 may also be adapted to apply rotation waveforms $e^{jw_{r1}t}$ to $e^{jw_{r(K-1)}t}$ or phase and amplitude components, $A_1$ to $A_{K-1}$ and $\phi_1$ to $\phi_{K-1}$, to the mixers 308 to 309. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320.

Figure 3C:
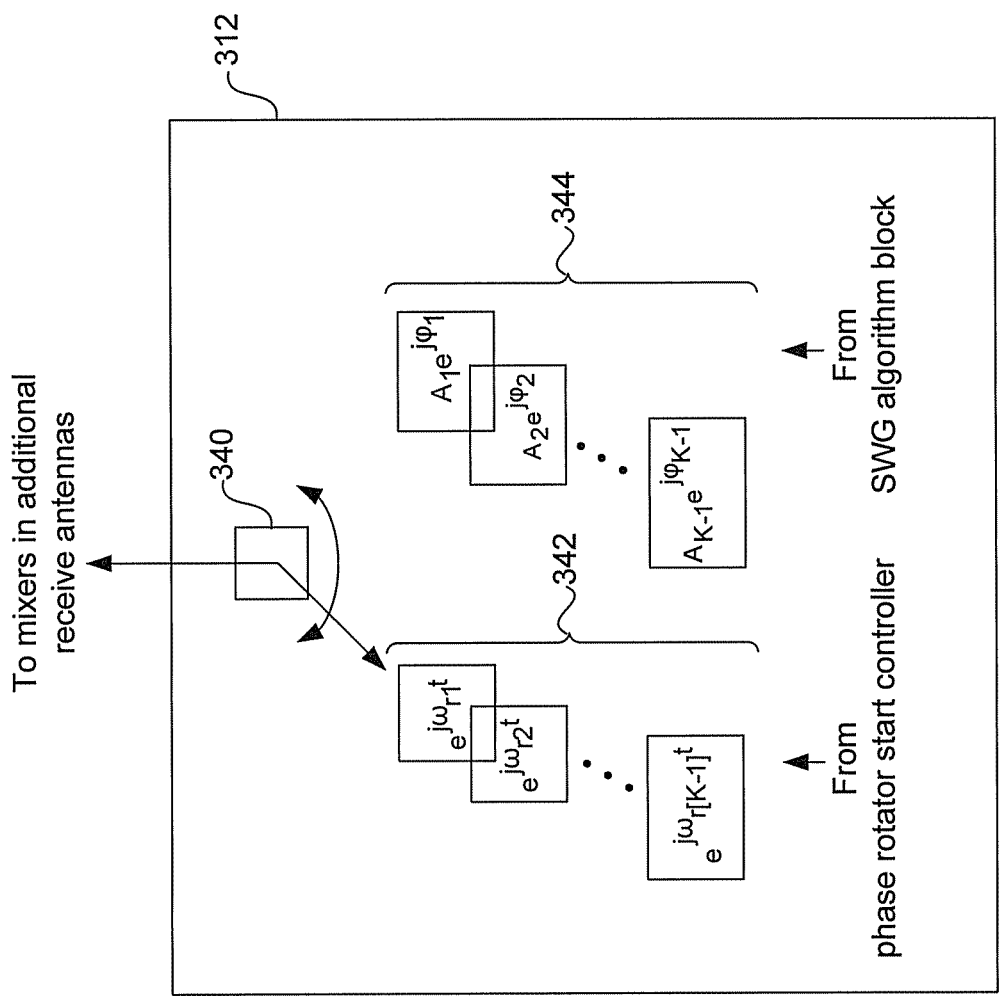
FIG. 3C is a block diagram of an exemplary RF phase and amplitude controller, in accordance with an embodiment of the invention.

FIG. 3C is a block diagram of an exemplary RF phase and amplitude controller, in accordance with an embodiment of the invention. Referring to FIG. 3C, the RF phase and amplitude controller 312 may comprise a switch 340, rotation waveform sources 342, and a plurality of SWG algorithm determined weights 344. The switch 340 may comprise suitable hardware, logic, and/or circuitry that may be adapted to select between the rotation waveforms $e^{jw_{r1}t}$ to $e^{jw_{r(K-1)}t}$ and the SWG algorithm determined weights $A_1 e^{j\phi_1}$ to $A_{K-1} e^{j\phi_{K-1}}$. The rotation waveform source 342 may comprise suitable hardware, logic and/or circuitry that may be adapted to generate the signal $e^{jw_{rk}t}$, where $w_{rk} = 2\pi f_{rk}$ and $f_{rk}$ is the rotation frequency that preserves orthogonality of the received signals at the multiple receiving antennas. The rotation frequency that preserves the signal orthogonality at the receiving antennas may be selected as $w_{rk} = k w_r$, where k=1, 2, 3 . . . K−1. Other rotation waveforms such as triangular or square may be utilized with the same frequency relationships. In addition, waveforms representing different orthogonal codes of the same frequency may be utilized, similar to the CDMA orthogonal codes with the same spreading. In this embodiment $e^{jw_{rk}t}$ is used as an exemplary waveform. The weights 344 may comprise suitable hardware, logic, and/or circuitry that may be adapted to generate the signals $A_1 e^{j\phi_1}$ to $A_{K-1} e^{j\phi_{K-1}}$ from the amplitude and phase components, $A_1$ to $A_{K-1}$ and $\phi_1$ to $\phi_{K-1}$, respectively.

In operation, the RF phase and amplitude controller 312 may apply the signals $e^{jw_{r1}t}$ to $e^{jw_{r(K-1)}t}$ to the mixers 308 to 309 in FIG. 3B based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signals $A_1 e^{j\phi_1}$ to $A_{K-1} e^{j\phi_{M-1}}$ to the mixers 308 to 309 in FIG. 3B.

Figure 4:
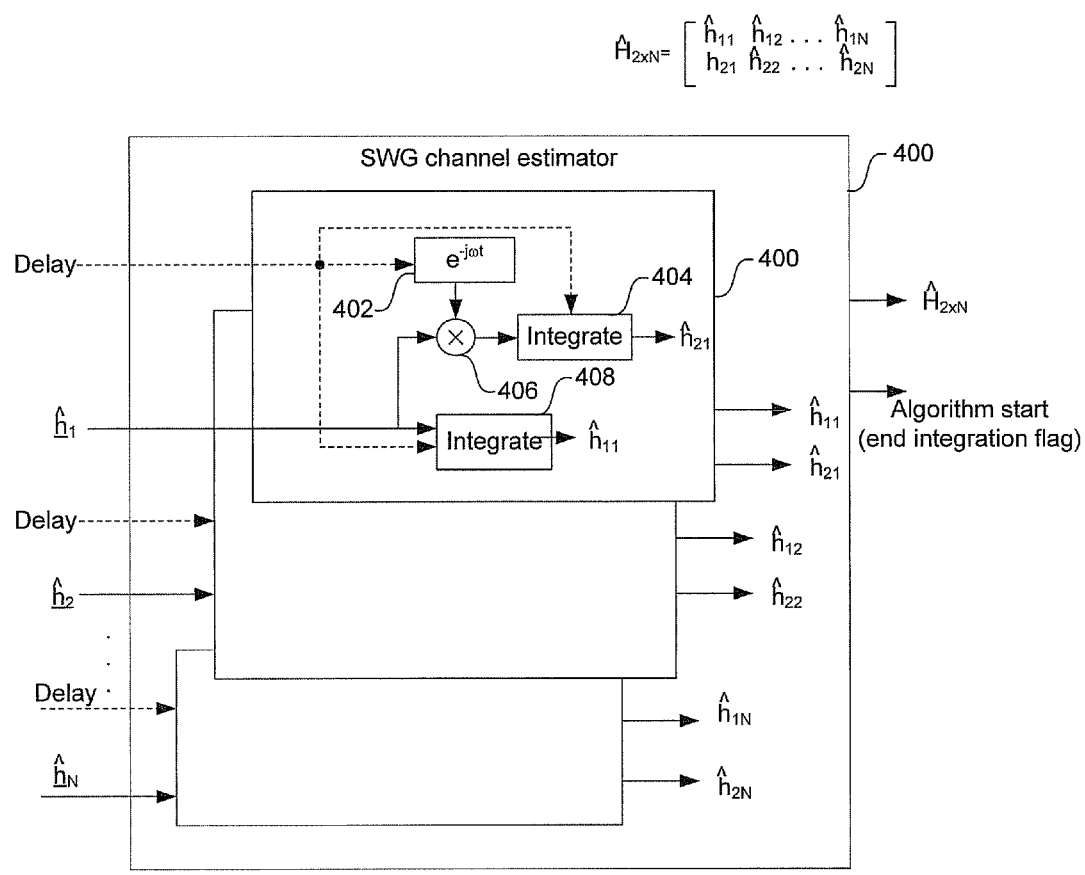
FIG. 4 is a block diagram of an exemplary system for determining channel estimation, in accordance with an embodiment of the invention.

FIG. 4 is a block diagram of an exemplary system for determining channel estimation, in accordance with an embodiment of the invention. Referring to FIG. 4, the SWG channel estimator 400 may comprise a phase rotator 402, a complex combiner 406, a first integrator 404 and a second integrator 408.

The SWG channel estimator 400 may comprise suitable logic, circuitry and/or code that may be adapted to receive a delay signal and channel estimates $\hat{h}_1 \ldots \hat{h}_N$ and generate a matrix of baseband combined channel estimates $\hat{H}_{2 \times N}$ and an algorithm start signal to the SWG algorithm block 320 (FIG. 3A). The phase rotator 402 may comprise suitable circuitry, logic and/or code that may be adapted to receive a delay signal and generate an output signal to the complex combiner 406. The complex combiner 406 may be adapted to receive a plurality of signals from the phase rotator 402 and the channel estimate $\hat{h}_1$ and generate a phase rotated output of the channel estimate $\hat{h}_1$ to the first integrator 404. The first integrator 404 may comprise suitable logic, circuitry and/or code that may be adapted to receive at least a delay signal and the output generated by the complex combiner 406. Based on these received inputs, the first integrator 404 may generate a channel estimate between the first transmit antenna Tx_1 302 and the second receive antenna Rx_2 304, $\hat{h}_{21}$, to the SWG algorithm block 320 (FIG. 3A). The second integrator 408 may comprise suitable logic, circuitry and/or code that may be adapted to receive at least a delay signal and the channel estimate $\hat{h}_1$ and generate a channel estimate between the first transmit antenna Tx_1 302 and the first receive antenna Rx_1 302, $\hat{h}_{11}$, to the SWG algorithm block 320 (FIG. 3A). Similarly, the channels between the remaining transmit antennas and the two receiving antennas Rx_1 302 and Rx_2 304 may be estimated.

In operation, as an example, the channel estimator 400 may determine, at the baseband, a combined estimate of the two baseband combined channel estimates between the two receive antennas and the first transmit antenna Tx_1 (FIG. 3A) as:

$$\hat{h}_1 = \hat{h}_{11} e^{jw_r t} \hat{h}_{21},$$

where $w_r = 2\pi f_r$ and $f_r$ is the rotation frequency. A channel estimate of the first receive antenna ($\hat{h}_{11}$) may be determined by taking the expected value or integration of $\hat{h}_1$ over a 0-360 degree rotation so that:

$$\hat{h}_{11} = E[\hat{h}_{11} + e^{jw_r t} \hat{h}_{21}] = \hat{h}_{11} + E[e^{jw_r t} \hat{h}_{21}],$$

where $E[e^{jw_r t} \hat{h}_{21}]$ over a full rotation is equal to zero. Channel estimate of the second antenna ($\hat{h}_{21}$) may be determined by taking the expected value or integration of $\hat{h}_1$ multiplied by a complex conjugate of the rotation waveform over a 0-360 degree rotation period. In this case, the channel estimate may be expressed as:

$$\hat{h}_{21} = E[e^{-jw_r t} \hat{h}_1] = E[e^{-jw_r t}(\hat{h}_{11} + e^{jw_r t} \hat{h}_{21})] = E[e^{-jw_r t} \hat{h}_{11} + \hat{h}_{21}] = E[e^{-jw_r t} \hat{h}_{11}] + \hat{h}_{21},$$

where $E[e^{-jw_r t} \hat{h}_{11}]$ over a full rotation is equal to zero. Similarly, channel estimates related to the combined channel estimates $\hat{h}_2 \ldots \hat{h}_N$ can be determined to obtain the matrix of channel estimates $\hat{H}_{2 \times N}$. Following this example, the matrix of channel estimates $\hat{H}_{K \times N}$ of FIG. 3B may be determined similarly by integration or multiplication by the complex conjugate of the rotation waveforms $e^{jw_{r1} t}$ to $e^{jw_{r(K-1)} t}$ and integration. In addition, the above channel estimator operation example may be extended to M receive antenna system with N RF chains RF_1 ... R_N to form the propagation channel estimate matrix $\hat{H}_{M \times N}$ of FIG. 1. The actual time varying channel impulse response estimates $\hat{h}_{xy}$ may comprise multiple propagation paths arriving at different delays. In that regard, the matrix $\hat{H}_{M \times N}$ of the propagation channel estimates may consist of multiple path estimates arriving at different delays. For each path arriving at a different delay, channel matrix estimate $\hat{H}_{M \times N}$ may be determined following the channel estimator 400 operation for each path.

The matrix $\hat{H}_{2 \times N}$ may be represented as:

$$\hat{H}_{2 \times N} = \begin{bmatrix} \hat{h}_{11} & \hat{h}_{12} & \ldots & \hat{h}_{1N} \\ \hat{h}_{21} & \hat{h}_{22} & \ldots & \hat{h}_{2N} \end{bmatrix}$$

Rotation on the additional antennas may be performed continuously, but a preferred embodiment is to perform the rotation periodically, as shown in FIG. 2. A continuous rotation may be perceived by the modem as a high Doppler, and for some modem implementations this may decrease the modem performance. The period between consecutive rotations may depend on the Doppler frequency. At a higher Doppler frequency, it may be necessary to more frequently track the channel, while at a lower Doppler frequency, tracking may be less frequent. The period may also depend on the desired modem performance and channel estimation accuracy. For example, if the Doppler frequency is 5 Hz, then a period between consecutive rotations of 1/50 sec. may be chosen. This results in 10 rotations or channel estimations per signal fade. The time duration of the rotation itself may be selected based on the channel estimation accuracy and corresponding modem performance. Generally, longer rotation time results in a better channel estimate because of the longer integration period.

The antenna rotation technique may be extended to multiple receive antennas (K) belonging to a single RF chain, RF_1 of FIG. 1 for example, as shown in the wireless system in FIG. 3B. In that case, K−1 antenna multiplying waveforms may be used which are orthogonal to each other.

Figure 5:
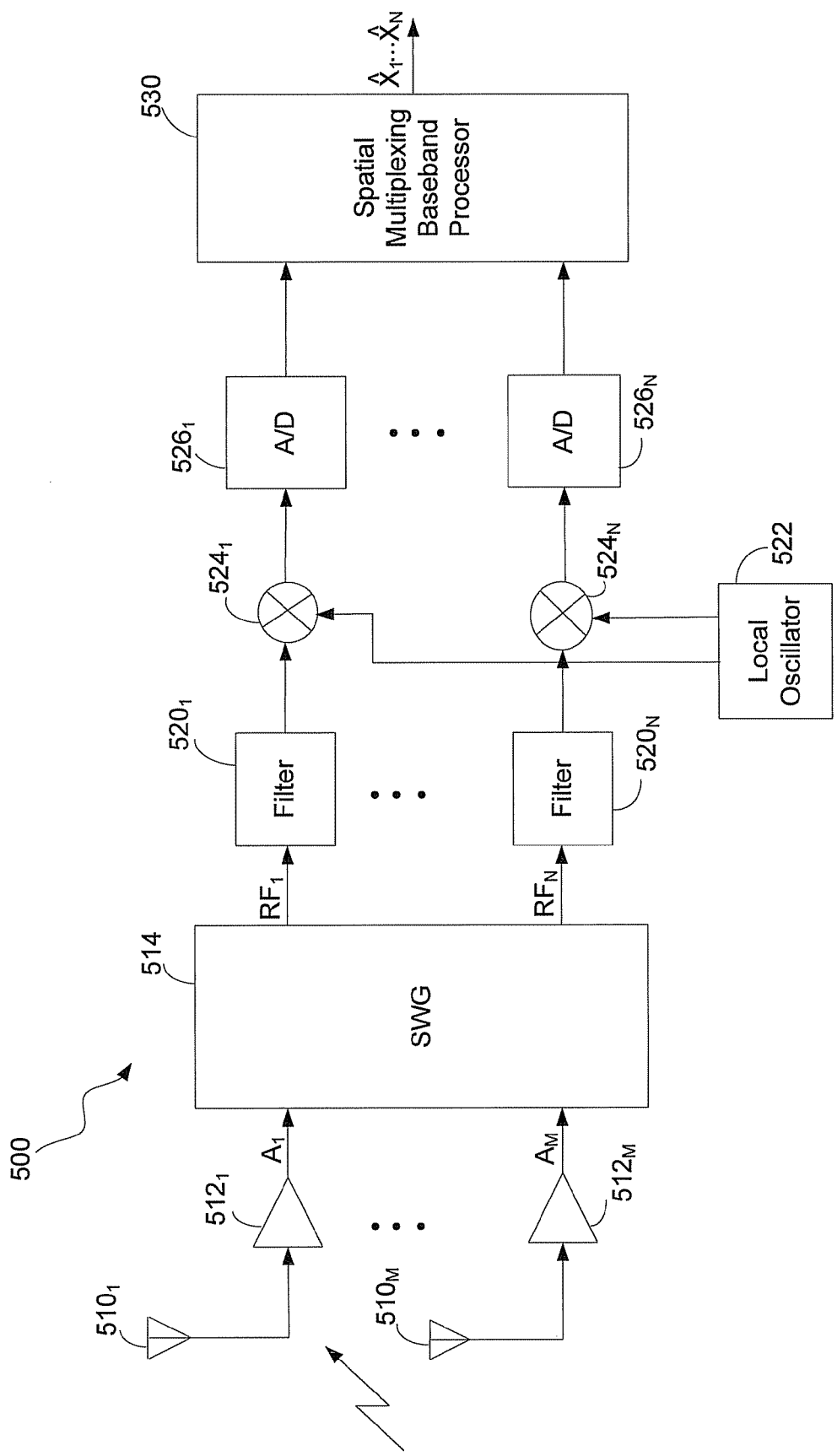
FIG. 5 is a block diagram of an exemplary receiver illustrating spatial multiplexing in a MIMO communication system that may be utilized in connection with an embodiment of the invention.

FIG. 5 is a block diagram of an exemplary receiver illustrating spatial multiplexing in a MIMO communication system that may be utilized in connection with an embodiment of the invention. Referring to FIG. 5, there is shown a receiver 500 that comprises a plurality of receive antennas 510$_{1, 2, \ldots, M}$, a plurality of amplifiers 512$_{1, 2, \ldots, M}$, a SWG block 514, a plurality of filters 520$_{1, 2, \ldots, N}$, a local oscillator 522, a plurality of mixers 524$_{1, 2, \ldots, N}$, a plurality of analog to digital (A/D) converters 526$_{1, 2, \ldots, N}$ and a spatial multiplexing baseband processor SMBB 530.

The antennas 510$_{1, 2, \ldots, M}$ may be adapted to receive the transmitted signals. The amplifiers 512$_{1, 2, \ldots, M}$ may be adapted to amplify the M received input signals. The SWG block 514 may comprise a plurality of amplitude and phase shifters to compensate for the phase difference between various received input signals. Weights may be applied to each of the input signals A_1 ... _M to modify the phase and amplitude of a portion of the transmitted signals received by the plurality of receive antennas 512$_{1 \ldots M}$ and generate a plurality of output signals RF_1 ... _N. The plurality of filters 520$_{1, 2, \ldots, N}$ may be adapted to filter frequency components of the RF substreams. The mixers 524$_{1, 2, \ldots, N}$ may be adapted to downconvert the analog RF substreams to baseband. The local oscillator 522 may be adapted to provide a signal to the mixers 524$_{1, 2, \ldots, N}$, which is utilized to downconvert the analog RF substreams to baseband. The analog to digital (A/D) converters 526$_{1, 2, \ldots, N}$ may be adapted to convert the analog baseband substreams into their corresponding digital substreams. The spatial multiplexing baseband processor SMBB 530 may be adapted to process the digital baseband substreams and multiplex the plurality of digital signals to generate output signals or symbols $\hat{X}_1 \ldots \hat{X}_N$ which may be estimates of the original spatial multiplexing sub-stream signals or symbols X_1 ... X_N.

In operation, the MT RF signals transmitted by a plurality of transmitters may be received by a plurality of M receive antennas 510$_{1, 2, \ldots, M}$ deployed at the receiver 500. Each of the M received signals may be amplified by a respective low noise amplifier 512$_{1, 2, \ldots, M}$. A plurality of weights may be applied to each of the input signals A_1 ... _M to modify the phase and amplitude of a portion of the transmitted signals received by the plurality of receive antennas 512$_{1 \ldots M}$. A plurality of output signals RF_1 ... _N may be generated, which may be filtered by a plurality of filters 520$_{1, 2, \ldots, N}$. The resulting N filtered signals may then be downconverted to baseband utilizing a plurality of N mixers 524$_{1, 2, \ldots, N}$, each of which may be provided with a carrier signal that may be generated by a local oscillator 522. The N baseband signals generated by the mixers 524$_{1, 2, \ldots, N}$ may then be converted to digital signals by a plurality of analog to digital (A/D) converters $526_{1, 2, \ldots, N}$. The N digital signals may further be processed by a spatial multiplexing baseband processor SMBB 530 to generate an output signals $\hat{X}_1 \ldots \hat{X}_N$, which are estimates of the original spatial multiplexing sub-stream signals or symbols $X_1 \ldots X_N$.

Figure 6:
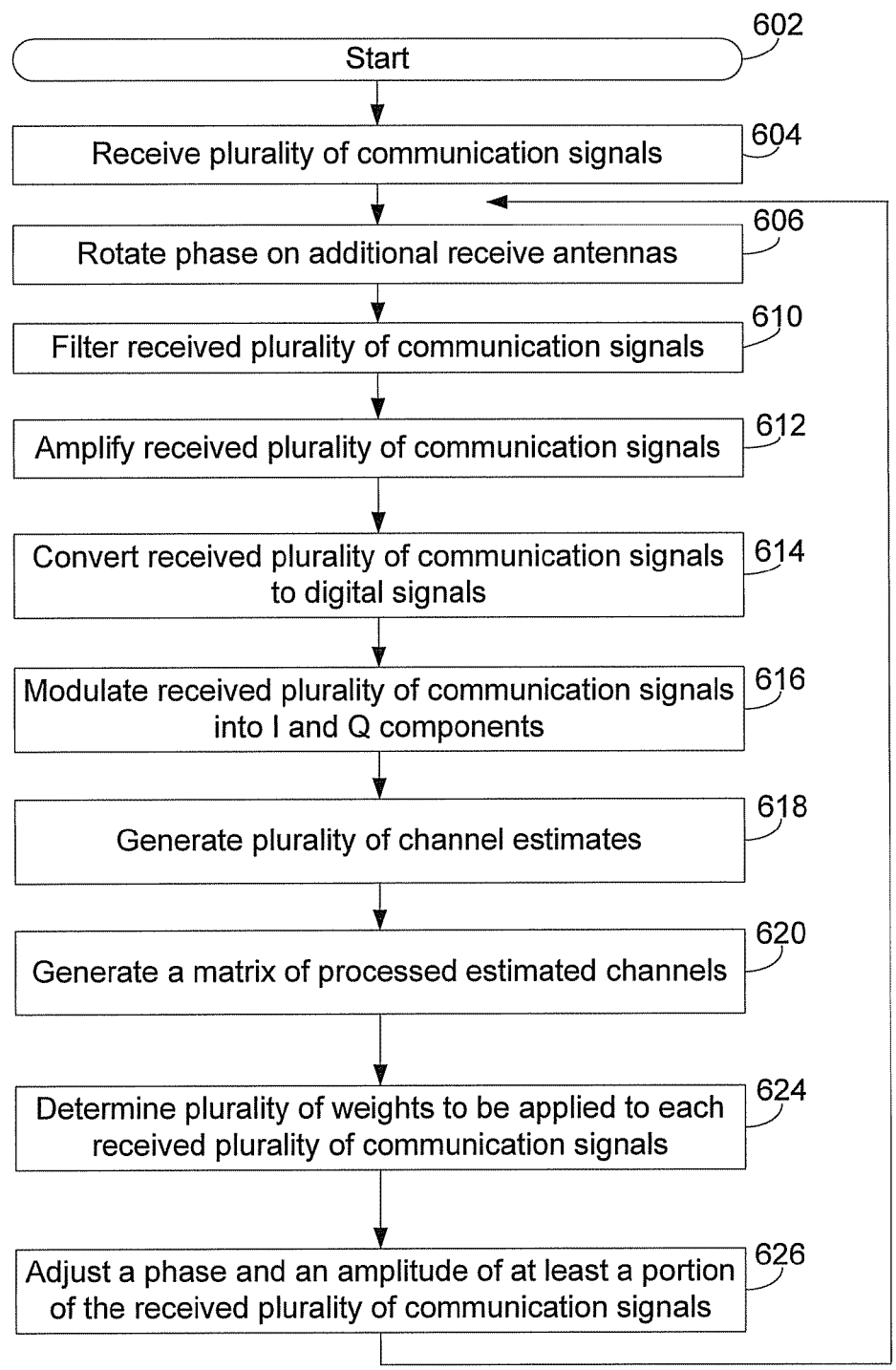
FIG. 6 is a flowchart illustrating exemplary steps that may be utilized for channel estimation in a spatially multiplexed wireless communication system, in accordance with an embodiment of the invention.

FIG. 6 is a flowchart illustrating exemplary steps that may be utilized for channel estimation in a spatially multiplexed wireless communication system, in accordance with an embodiment of the invention. Referring to FIG. 6, the exemplary steps may start at step 602. In step 604, a plurality of communication signals may be received by a plurality of receive antennas. In step 606 rotate phase at additional receive antennas. In step 610, the received plurality of communication signals may be filtered. In step 612, a low noise amplifier may amplify the received plurality of communication signals. In step 614, an analog to digital converter may convert the received plurality of communication signals into digital signals. In step 616, a chip matched filter may modulate the received plurality of communication signals into in phase (I) and quadrature (Q) components.

In step 618, a plurality of baseband combined channel estimates $\hat{h}_1 \ldots \hat{h}_N$ may be generated by a spatial multiplexing baseband processor. In step 620, the matrix of channel estimates $\hat{H}_{M \times N}$ may be determined from the combined channel estimates $\hat{h}_1 \ldots \hat{h}_N$. In step 624, a weight generator may determine a plurality of correction weights that may be applied to each of the received plurality of communication signals to maximize the receiver signal-to interference-to-noise-ratio (SINR), for example. In step 626, the generated plurality of amplitude and phase correction signals $A_i$ and $\phi_i$ respectively may be applied to the mixers at receiving antennas. Control then passes to step 606 for periodic channel estimation and amplitude and phase correction.

In another embodiment of the invention, a system for channel estimation in a communication system may be provided. With reference to FIG. 1, a plurality of receive antennas $106_{1 \ldots M}$ may be adapted to receive a plurality of spatially multiplexed communication signals for a single channel from a plurality of transmit antennas $128_{1 \ldots N}$. A spatial multiplexing baseband processor SMBB 126 may generate a plurality of baseband combined channel estimates $\hat{h}_1$ to $\hat{h}_N$ based on phase rotation in response to receiving the plurality of spatially multiplexed communication signals $RF_{1 \ldots N}$. The SWGBB 121 may generate a plurality of amplitude and phase correction signals $A_i$ and $\phi_i$ based on the generated plurality of baseband combined channel estimates $\hat{h}_1$ to $\hat{h}_N$. The SWG 110 may utilize the generated matrix of channel estimates $\hat{H}_{M \times N}$ from the plurality of amplitude and phase correction signals to modify the phase and amplitude of at least a portion of the transmitted signals received by the plurality of receive antennas $106_{1 \ldots M}$ and generate a plurality of output signals $RF_{1 \ldots N}$.

A SWG algorithm 124 may determine a plurality of weights that may be applied to each of the received plurality of spatially multiplexed communication signals. The SWG 110 may be adapted to adjust a phase and an amplitude of at least a portion of the received plurality of spatially multiplexed communication signals based on the determined plurality of weights. The baseband processor SMBB 126 may be adapted to spatially demultiplex the received plurality of spatially multiplexed communication signals $RF_{1 \ldots N}$. A filter may be adapted to filter the received plurality of spatially multiplexed communication signals. A low noise amplifier may be adapted to amplify the received plurality of spatially multiplexed communication signals. The baseband processor SMBB 126 may be adapted to generate the plurality of baseband combined channel estimates $\hat{h}_1$ to $\hat{h}_N$. A plurality of chip matched filters (CMF) $116_{1 \ldots N}$ may be adapted to modulate the received plurality of communication signals into in phase (I) components and quadrature (Q) components. The SWG channel estimator 122 may generate a matrix of channel estimates $\hat{H}_{M \times N}$ based on receiving the generated plurality of baseband combined channel estimates $\hat{h}_1$ to $\hat{h}_N$ from the SMBB processor 126.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
generating a channel estimation matrix based on phase rotation, if a number of receive antennas is greater than a number of radio frequency (RF) chains; and
adjusting one or both of: a phase and an amplitude of at least a portion of received plurality of spatially multiplexed communication signals based on said generated channel estimation matrix.

2. The method according to claim 1, further comprising generating a plurality of baseband combined channel estimates based on said phase rotation, in response to receiving said plurality of spatially multiplexed communication signals.

3. The method according to claim 2, wherein said generating a channel estimation matrix comprises generating said channel estimation matrix based on said generated plurality of baseband combined channel estimates.

4. The method according to claim 1, wherein said adjusting comprises adjusting said amplitude of said at least portion of said received plurality of spatially multiplexed communication signals based on a generated plurality of amplitude correction signals.

5. The method according to claim 1, wherein said adjusting comprises adjusting said amplitude of said at least portion of said received plurality of spatially multiplexed communication signals based on a determined plurality of weights.

6. The method according to claim 1, wherein said adjusting comprises adjusting said phase of said at least portion of said received plurality of spatially multiplexed communication signals based on a generated plurality of phase correction signals.

7. The method according to claim 1, wwherein said adjusting comprises adjusting said phase of said at least portion of said received plurality of spatially multiplexed communication signals based on a determined plurality of weights.

8. The method according to claim 1, further comprising modulating using chip matched filters, said received plurality of spatially multiplexed communication signals to generate in-phase and quadrature components.

9. The method according to claim 8, further comprising generating a plurality of baseband combined channel estimates based on said generated in-phase and said quadrature components.

10. The method according to claim 1, wherein said generating a channel estimation matrix comprises generating said channel estimation matrix without said phase rotation, if said number of said receive antennas equals said number of said RF chains.

11. A system for communication, the system comprising:
one or more circuits configured to generate a channel estimation matrix based on phase rotation, if a number of receive antennas is greater than a number of radio frequency (RF) chains, wherein
said one or more circuits is configured to adjust one or both of: a phase and an amplitude of at least a portion of received plurality of spatially multiplexed communication signals based on said generated channel estimation matrix.

12. The system according to claim 11, wherein said one or more circuits is further configured to generate a plurality of baseband combined channel estimates based on said phase rotation, in response to receiving said plurality of spatially multiplexed communication signals.

13. The system according to claim 12, wherein said one or more circuits is configured to generate said channel estimation matrix based on said generated plurality of baseband combined channel estimates.

14. The system according to claim 11, wherein said one or more circuits is configured to adjust said amplitude of said at least portion of said received plurality of spatially multiplexed communication signals based on a generated plurality of amplitude correction signals.

15. The system according to claim 11, wherein said one or more circuits is configured to adjust said amplitude of said at least portion of said received plurality of spatially multiplexed communication signals based on a determined plurality of weights.

16. The system according to claim 11, wherein said one or more circuits is configured to adjust said phase of said at least portion of said received plurality of spatially multiplexed communication signals based on a generated plurality of phase correction signals.

17. The system according to claim 11, wherein said one or more circuits is configured to adjust said phase of said at least portion of said received plurality of spatially multiplexed communication signals based on a determined plurality of weights.

18. The system according to claim 11, wherein said one or more circuits is further configured to modulate, using chip matched filters, said received plurality of spatially multiplexed communication signals to generate in-phase and quadrature components.

19. The system according to claim 18, wherein said one or more circuits is further configured to generate a plurality of baseband combined channel estimates based on said generated in-phase and said quadrature components.

20. The system according to claim 11, wherein said one or more circuits is configured to generate said channel estimation matrix without said phase rotation, if said number of said receive antennas equals said number of said RF chains.

* * * * *